(12) United States Patent
Yoo et al.

(10) Patent No.: US 7,313,329 B2
(45) Date of Patent: Dec. 25, 2007

(54) ALL OPTICAL VARIABLE BUFFER QUEUE USEFUL IN OPTICAL PACKET NETWORKS

(75) Inventors: SungJoo Ben Yoo, Davis, CA (US); Haijun Yang, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 114 days.

(21) Appl. No.: 10/934,668

(22) Filed: Sep. 2, 2004

(65) Prior Publication Data
US 2005/0053375 A1    Mar. 10, 2005

Related U.S. Application Data

(60) Provisional application No. 60/500,406, filed on Sep. 4, 2003.

(51) Int. Cl.
*H04J 14/00* (2006.01)
(52) U.S. Cl. .................................. 398/58
(58) Field of Classification Search .............. None
See application file for complete search history.

(56) References Cited

U.S. PATENT DOCUMENTS

| | | | | |
|---|---|---|---|---|
| 3,604,936 A | * | 9/1971 | Kompfner | 398/52 |
| 5,367,586 A | * | 11/1994 | Glance et al. | 385/24 |
| 5,506,712 A | * | 4/1996 | Sasayama et al. | 398/47 |
| 5,796,501 A | * | 8/1998 | Sotom et al. | 398/59 |
| 6,028,693 A | * | 2/2000 | Fork et al. | 359/248 |
| 6,445,473 B1 | * | 9/2002 | Suemura et al. | 398/48 |
| 6,493,120 B1 | * | 12/2002 | Tancevski | 398/47 |
| 6,810,211 B1 | * | 10/2004 | Castanon | 398/47 |
| 2002/0085251 A1 | * | 7/2002 | Ofek et al. | 359/117 |
| 2004/0105675 A1 | * | 6/2004 | Beacken | 398/49 |
| 2004/0151171 A1 | * | 8/2004 | Lee et al. | 370/380 |
| 2004/0208555 A1 | * | 10/2004 | Pau et al. | 398/56 |

OTHER PUBLICATIONS

Publication: M.D. Lukin et al., "Controlling photons using electromagnetically induced transparency", Nature, vol. 413, No. 20, Sep. 2001, pp. 273-276.
Publication: B. Gayral et al., "High-Q wet-etched GaAs microdisks containing InAs quantum boxes", Applied Physics Letters, vol. 75, No. 13, Sep. 27, 1999, pp. 1908-1910.

(Continued)

Primary Examiner—Shi K. Li
Assistant Examiner—David Lee
(74) Attorney, Agent, or Firm—Park, Vaughan & Fleming LLP

(57) ABSTRACT

A variable optical buffer queue, particularly useful either as an input or an output queue in an optical packet router in a wavelength-division multiplexing (WDM) communication network. An input queue includes plural separately controllable optical delay units disposed on wavelength channels between a demultiplexer and tunable wavelength converters controlling switching through a wavelength router. An output queue includes for each output port of a wavelength router plural separately controllable optical delay units tuned to different wavelengths. The delay units may induce selective amounts of delay and may be implemented as a series of controlled microresonators coupled to waveguide. Such a structure is usable as a controllably accessible optical memory.

18 Claims, 7 Drawing Sheets

OTHER PUBLICATIONS

Publication: J. Vuckovic et al., Phontonic crystal microcavities for cavity quantum electrodynamics with a single quantum dot, Applied Physics Letters, vol. 82, No. 15, Apr. 14, 2004, pp. 2374-2376.

Publication: R. Gover et al., "Vertically coupled GaInAsP-InP microring resonators", Optics Letters, vol. 26, No. 8, Apr. 15, 2001, pp. 506-508.

Publication: D. Rafizadeh et al., "Waveguide-coupled AlGaAs/GaAs microcavity ring and disk resonators with high finesse and 21.6-nm free spectral range", Optics Letters, vol. 22, No. 16, Aug. 15, 1997, pp. 1244-1246.

Publication: A.V. Turukin et al., "Observations of Ultraslow and stored light pulses in a solid", Physical Review Letters, vol. 88, No. 2, Jan. 14, 2002, pp. 023602-1 to 023602-4.

Publication: Amnon Yariv et al., "Coupled-resonator optical waveguide: a proposal and analysis", Opotics Letters, vol. 24, No. 11, Jun. 1, 1999, pp. 711-713.

Publication: Shantui Fan, Sharp asymmetric line shapes in side-coupled waveguide-cavity systems, Applied Physics Letters, vol. 80, No. 4, Feb. 11, 2002, pp. 908-910.

Publication: B. E. Little et al., "Microring resonator channel dropping filters", Journal of Lightwave Technology, vol. 15, No. 6, Jun. 1997, pp. 998-1005.

Publication: M. Notomi et al., "Extremely large group-velocity dispersion of line-defect waveguides in photonic crystal slabs", Physical Review Letters, vol. 87, No. 25, Dec. 17, 2001, pp. 253902-1 to 253902-4.

* cited by examiner

ALL OPTICAL VARIABLE BUFFER QUEUE USEFUL IN OPTICAL PACKET NETWORKS

RELATED APPLICATION

This application claims benefit under 35 U.S.C. §119 of provisional application 60/500,406, filed Sep. 4, 2003, which is incorporated herein by reference in its entirety.

BACKGROUND OF THE INVENTION

1. Field of the Invention

The invention relates generally to switches used in optical communications networks. In particular, it relates to optical routers and optical buffers used therein.

2. Background Art

Two important recent advances in communication networks include large, high-capacity networks based on packet switching and optical fiber transmission media, in particular silica fiber. More recent further advances include asynchronous packet switching, such as the TCP/IP protocol of Internet networks, and wavelength-division multiplexing (WDM) of multiple optical signals on a single fiber. Combining these advances has presented difficulties.

Heretofore, the switching of asynchronous packets has been typically performed by electronic routers, which require electro-optical conversion of optical signals before and after switching. Electronic routers in WDM networks are difficult to scale to a large number of channels and present other problems of carrying different types of traffic on a large network.

An optical router is greatly desired to perform the packet switching without converting the data payload of the packet to optical form. Yoo has described such an optical router in U.S. patent application Ser. No. 09/654,384, filed Sep. 1, 2000, now issued as U.S. Pat. No. 6,519,062, incorporated herein by reference in its entirety. Yoo has also described the integration of such an optical router on a single substrate in U.S. patent application Ser. No. 10/081,396, filed Feb. 22, 2002, now issued as U.S. Pat. No. 6,768,827, incorporated herein by reference in its entirety.

A principal problem with optical routers is the difficulty of implementing optical memory, particularly random access optical memory. Some sort of memory is desired when two packets arrive on different source fibers and both require transmission to a same destination fiber, that is, memory to resolve contention. The multiple channels of a WDM fiber can alleviate some contention, but at the expense of excess capacity. TCP/IP allows some packet loss if the contention cannot be resolved, but the loss rate needs to be minimized. A feedback fiber of substantial length can be installed from the output side to the input side of the router to provide a fixed delay storage, but the feedback route complicates the router control and may contribute to further delay. Proposals have been made for parallel banks of selected fibers of different lengths. However, such an arrangement splits the optical power and requires bulky fibers.

Several approaches to packet buffering are described by Zhong et al. in "A new wavelength-routed photonic packet buffer combining traveling delay lines with delay-line loops," *Journal of Lightwave Technology*, vol. 19, no. 8, August 2001, pp. 1085-1092 and by Hunter et al. in "Buffering in optical packet switches," ibid., vol. 16, no. 12, December 1998, pp. 2081-2094.

SUMMARY OF THE INVENTION

An optical router, particularly one for packet switching networks utilizing wavelength division multiplexing (WDM) includes a variable optical queue, either on its input or its output or both.

A WDM optical router may include one or more optical demultiplexers receiving multi-wavelength WDM optical signal on an optical fiber or other waveguide to divide it into its wavelength components on first waveguides, tunable wavelength converters converting the carrier wavelengths of the wavelength components into switching wavelengths determining the switching path, a wavelength router receiving all the wavelength converted signals on respective input ports and switching them, preferably passively, to output ports dependent upon the respective switching wavelengths, fixed wavelength converters to convert the carrier wavelengths of the switch signals to WDM wavelengths, a optical multiplexers for combining the reconverted signals into a multi-wavelength output signal. The demultiplexers, wavelength router, and multiplexers may be implemented as respective arrayed waveguide gratings (AWGs).

The optical router may include an input queue to selectively delay the different wavelength components of the input signal. The input queue may include a plurality of delay units placed between the demultiplexer and the wavelength router, preferably before the tunable wavelength converter. Each delay unit is tailored to have an electrically selected delay for a particular wavelength carried on the demultiplexed optical channel. The delay units may have several separately controllable stages arranged along a same waveguide to provide gradations of delay, for example, a sequence of exponentially sized stages.

The optical router may include an output queue to selectively delay the different wavelength components of the signals after switching. The output queue may include a plurality of stages of delay units placed between the wavelength router and the demultiplexer, preferably before the fixed wavelength converters. Each stage may be tailored to the different switching wavelengths.

The delay units may be implemented as a series of microresonators tailored to a particular wavelength and operatively associated with a waveguide carrying the optical signal.

The invention also includes an optical router in which an assembly of microresonator array provide an input delay to the separate wavelength components after a multi-wavelength signal has been demultiplexed into single-wavelength channels. The input delay allows decoding of the packet header prior to the packet arriving at the routing element. Power splitters may be placed between the demultiplexer and the input delay assembly to tap a portion of the optical signals to the router controller. The invention also includes an optical router including a recirculation path including a microresonator array.

Another aspect of the invention includes an optical memory including an electrically controllable microresonator array coupled to a waveguide carrying an optical signal to be selectively delayed. For example, the optical memory may include a plurality of microresonator arrays tailored to different wavelengths of a multi-wavelength signal carried by the waveguide coupled to the microresonator arrays.

DETAILED DESCRIPTION OF THE PREFERRED EMBODIMENTS

Packet loss at an optical router may be greatly reduced by including controllable optical buffers either on the input side of the router or on the output side or on both sides, thus providing a controllable queuing function to the router, either from the input fiber into the optical router or from the optical router to the output fiber.

Figure 1:
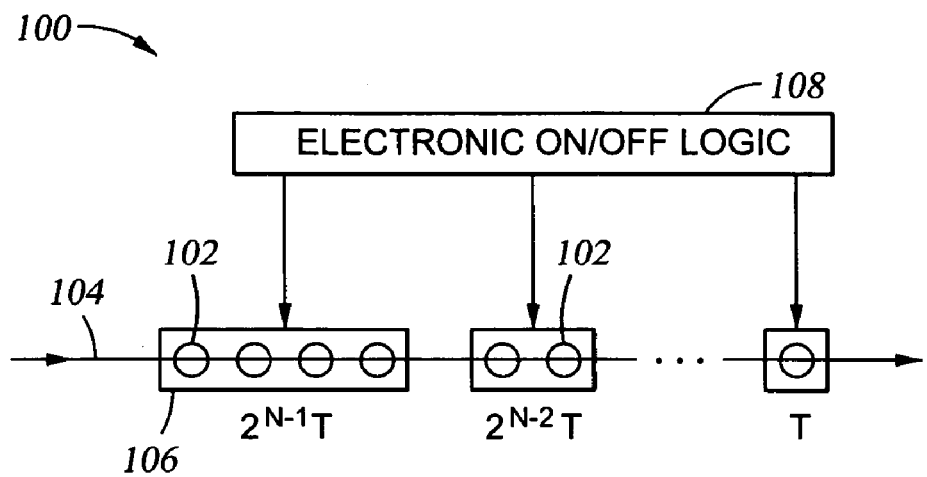
FIG. 1 is a schematic diagram of a single-wavelength electrically controllable optical delay unit of the invention having exponentially sized delay units, which may be used as an optical buffer.

Although the invention is not so limited, one type of optical buffer is a variable all-optical unit 100 illustrated schematically in FIG. 1. It includes a series of microresonators 102 arranged along an optical waveguide 104 and grouped in N exponentially sized delay components 106 serially connected along the waveguide 104. Each delay component 106 contains $2^M$ serially connected microresonators 102, where M increases from 0 to (N−1) for the N delay components 106. An electronic on/off logic 108 electronically tunes the resonances of the microresonators 102 to vary the finesse F of the resonant microcavities. The value of the finesse F may vary between 1 and $10^7$, although smaller differences are still effective. The higher finesse is associated with a lower propagation speed through or adjacent the microresonator and hence a significant delay. However, such a high finesse can be achieved only for a very narrow wavelength band dictated by the structure of the resonance.

In the context of wavelength division multiplexing (WDM), one WDM wavelength may be delayed while its neighboring WDM wavelength in the WDM wavelength grid is not delayed. Thus, tuning the finesse provides a selectable optical delay of time T for a selected WDM wavelength channel. In practice, in the off state, there is a finite delay which however is significantly less than the delay time in the on state, for example, picoseconds versus microseconds although smaller differences are nonetheless effective. The difference between the two delays is the effective switched delay time T. The structure associated with each microresonator, may be on the order of 10 to 40 µm, which after division by the speed of light in the semiconductor structure yields a non-resonating propagation or delay time t of about 0.2 ps. However, if the resonance is turned on, the delay t is multiplied by the resonance's finesse F, thus yielding a selectable delay T of up to 2 µs per resonance. The optical signal on the waveguide serially passes by all the microresonators 102 in all of the delay components 106 and accumulates a switched delay from all the electrically controlled microresonators 102. In the embodiment of the optical buffer 100 of FIG. 1, all the microresonators 102 within a given delay component 106 are commonly controlled by the on/off logic 108 to be in the same on or off state. However, the on/off logic 108 separately controls the different delay components 106, thus providing selected delays of $2^M T$, where M varies between 0 and N−1. Furthermore, multiple delay components may simultaneously be turned on to thus provide a variable delay of a selectable N-bit binary number multiplied by T.

The microresonators 102 may be implemented in several ways. Substantial finesses can be achieved by structures utilizing electromagnetically induced transparency, a process summarized by Lukin et al. in "Controlling photons using electromagnetically induced transparency," *Nature*, vol. 413, pp. 273-276. In some applications, the combination of waveguide and resonator can be achieved in a photonic crystal structure, as explained by Notomi et al. in "Extremely large group-velocity dispersion of line-defect waveguides in photonic crystal slabs," *Physical Review Letters*, vol. 87, no. 25, 17 Dec. 2001. Other applications separate the waveguide from the microresonators. One configuration side couples the waveguide 102 to microresonators 104 on the side of the waveguide 102 where the resonator may include a micro-ring, micro-disk, and/or photonic crystal resonator and may be enclosed in Fabry-Perot etalons. The theory for side coupling is disclosed by Little et al. in "Microring resonator channel dropping filters," *Journal of Lightwave Technology*, vol. 15, no. 6, pp. 998-1004 and by Fan in "Sharp asymmetric line shapes in side coupled waveguide-cavity systems," *Applied Physics Letters*, vol. 80, no. 6, pp. 908-910, 11 Feb. 2002. Grover et al. disclose the fabrication of microring resonators in "Vertically coupled GaInAsP-InP microring resonators," *Optics Letters*, vol. 6, no. 8, pp. 506-508,15 Apr. 2001. Gayral et al. disclose the fabrication of microdisks in "High-Q wet-etched GaAs microdisks containing InAs quantum boxes." Vuckovic et al. in "Photonic crystal microcavities for cavity quantum electrodynamics with a single quantum dot," *Applied Physics Letters*, vol. 82, no. 15, pp. 2374-2376 disclose a photonic cavity which can be side coupled to a waveguide.

The resonance tuning may be accomplished through an electrode overlaid on the microresonator or the portion of the waveguide coupling to the microresonator and selectively biased by the on/off logic 108. The biasing can be in the form of electrical voltage biasing or electrical current injection. In typical semiconductor materials, applying electrical voltage bias increases the refractive index and increases the resonant wavelength. On the other hand, injecting current typically reduces the refractive index and decreases the resonant wavelength. Typically, electrical voltage biasing can be applied and rapidly modulated with rise times in some cases of less than 50 ps and thus is the preferred biasing method. If the unbiased structure exhibits the required high finesse at a particular wavelength, significant biasing will greatly reduce the finesse and hence reduce the delay at that wavelength while typically shifting the resonance to a neighboring wavelength. Alternatively, the biasing may bring a desired wavelength into resonance from unbiased non-resonance. To achieve the selected delays required of the invention, these structures need to be implemented in a fast semiconductor material transparent to the WDM carrier wavelengths, such as InP. A fractional change of the refractive index of $10^{-4}$ accomplished by the biasing, which is easily achievable through carrier effects in InP, is sufficient to change the resonant frequency by about 20 GHz, a typical bandwidth for a WDM signal. Hence, selective biasing can move the WDM signal into and out of the effective resonance of the microcavity.

Advantageously, the microresonators are paired with neighboring or at least other resonators spaced along the waveguide having slightly different resonance frequencies which bracket a central delay band of width, for example, of 20 GHz with a central frequency corresponding to the WDM wavelength. The two resonances can be tuned together but in opposite directions into or out of the central delay band. As a result, in one state, the delay at the WDM wavelength between the peaks of the two resonances, but in the other state the WDM wavelength falls on or near the top of both resonances, thus doubling the delay and providing more uniform response in view of process and control variations.

Figure 2:
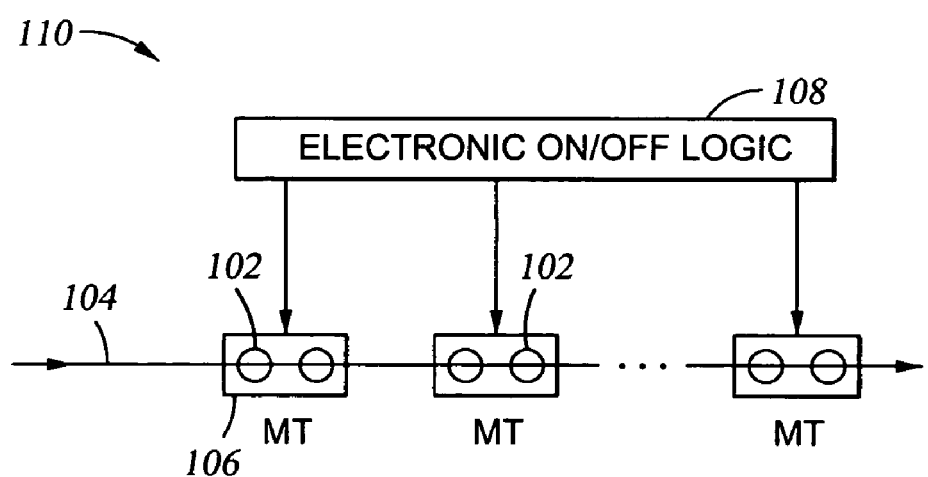
FIG. 2 is a schematic diagram of a single-wavelength electrically controllable optical delay unit of the invention having equally sized delay units.

Although the serially connected, exponentially sized delay components 104 provide great flexibility, other designs are possible. For example, a single delay component having M microresonators provides a switched delay of MT, which may correspond generally to a packet length. Another optical delay unit 110, illustrated in FIG. 2, includes a plurality of serially connected, equally sized delay components 106 providing delays that are either zero or selected multiples of a base delay time MT. In general, the delay unit may include a plurality of separately controlled delay components with any distribution of number of microresonator and hence delays between the delay components. Since the packets are propagating along a serial path of a large number of relatively small selected delays, each delay unit 110 may be long enough to store multiple packets of the same wavelength as they simultaneously advance in sequence along the waveguide 104 of the delay unit 100, 110, or 116.

Figure 3:
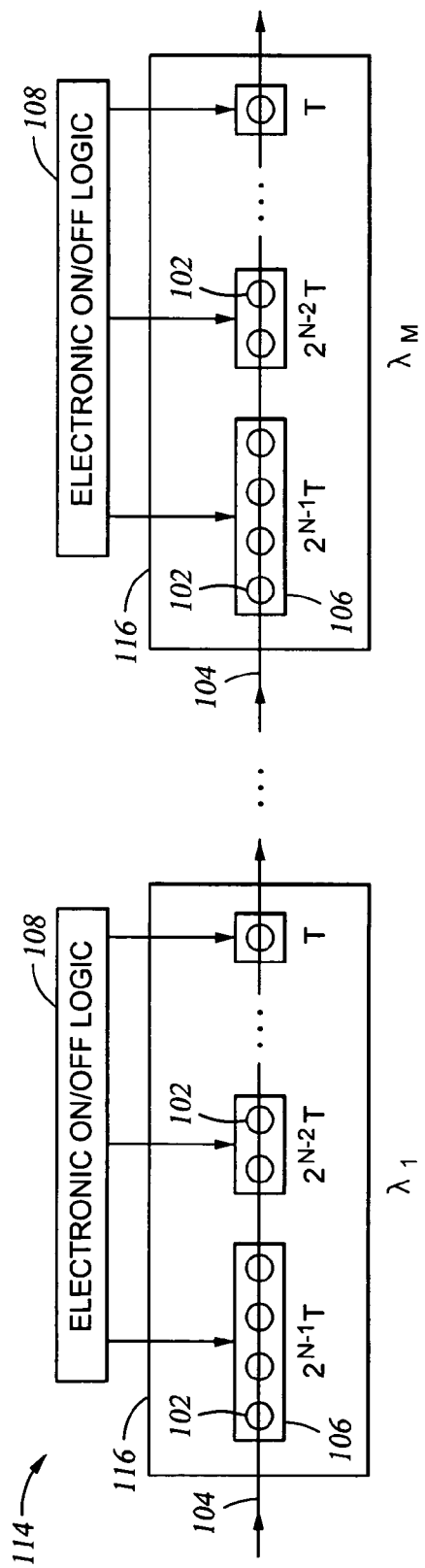
FIG. 3 is a schematic diagram of a multiple-wavelength optical delay unit of the invention in which the delays of the individual wavelengths can be separately controlled.

A single-wavelength variable queuing buffer may be satisfactory on an optical waveguide bearing a single WDM wavelength since the resonances are structurally or otherwise tailored to that wavelength. However, it may be advantageous to apply variable buffer queuing to a multi-wavelength optical waveguide to provide the capability of independently delaying the different wavelength components. Because the resonances associated with selectable delay elements are so narrow that they affect only a single WDM wavelength, different structures may be needed for the different WDM wavelengths. In one multi-wavelength embodiment, an M-stage optical buffer 114, as illustrated in FIG. 3, includes a cascaded series of M variable delay units 116, arranged along a single waveguide 104 carrying a multi-wavelength optical WDM signal. Each of the serially connected delay units 116 is similar to those of FIGS. 1 and 2 but each delay unit 116 is structurally tailored or tuned to a respective one of the WDM wavelengths $\lambda_1$ to $\lambda_M$ and is transparent (minimum delay) to the other WDM wavelengths. Thereby, the M on/off logic units 108 can together select separate variable delays for the different WDM channels.

Figure 4:
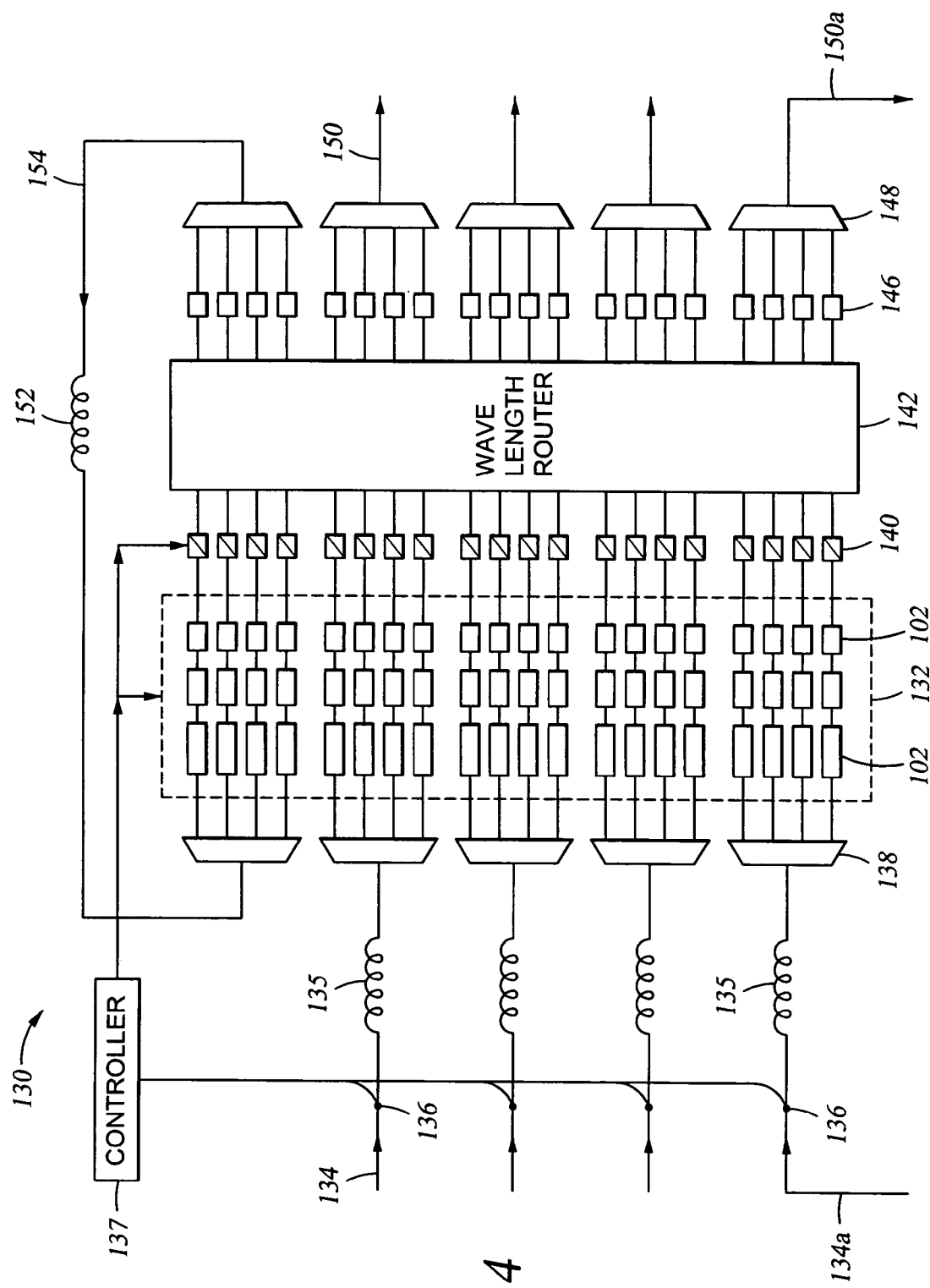
FIG. 4 is a schematic diagram of an optical router including a variable optical input buffer.

An optical router 130, functionally illustrated in the schematic diagram of FIG. 4, is based on the optical router of my former applications but additionally includes a variable multi-channel optical input buffer 132. The optical router 130 receives WDM input signals on K input fibers 134, where K=4 is illustrated although the lowest fiber 134a is illustrated to suggest a local optical add/drop multiplexer (OADM). An optical delay 135 imposes a fixed delay, for example of 150ns, onto all the WDM signals to allow the WDM signals to be split by taps 136 positioned before the delays 135 and detected to allow a router controller 137 to decode the packet header information to thereby control the optical router before the packet data or payload arrives at the routing element. Conventionally, a long loop of optical fiber provides the needed input delay common to all the WDM components. Demultiplexers 138 decompose the K multi-wavelength input signals into their respective W single-wavelength components, wherein W=4 is illustrated but a larger number of WDM wavelengths is contemplated and W may vary between the different input and output fibers. The demultiplexers 148 may be implemented as arrayed waveguide gratings (AWGs).

The variable multi-wavelength optical buffer 132 receives the WK single-wavelength signals from the demultiplexers 138 and separately processes them through WK single-wavelength optical delay units, such as the delay unit 100 of FIG. 1, each including exponentially sized delay components 102 controlled by the router controller 137, which assumes the function of the on/off logic 108, to ease congestion through the router. The delay components 102 for a particular channel can be electronically controlled by the controller 137 to impose a selected delay upon the WDM component of the incoming packet to assure that an output path is available. Each of the single-wavelength optical delay components 102 and its microresonators arranged along one waveguide have a structure tailored to the WDM wavelength that it is processing on that waveguide so that the resonators or other structure providing the selective delay are properly sized for the wavelength to be delayed.

The respective delayed optical signals are received by WK variable wavelength converters 140, which separately convert the wavelength of the WDM carrier while maintaining the carrier modulation bearing the packet data as well as control information, which is typically unnecessary at this point. A wavelength router 142 receives the WK wavelength-converted signals on respective input ports and routes them to respective WK output ports dependent upon the wavelength of the input signal. The wavelength router 142 may be implemented as an arrayed waveguide grating (AWG). I have explained the structure and function of this type of WDM packet switching in my U.S. Pat. Nos. 6,519,062 and 6,768,827.

In view of this structure, the router controller 137 tunes the adjustable wavelength converters 140 to a switching wavelength dependent upon the intended switching direction through the optical router 130. The wavelength router 142 receives the WK separately tuned optical signals and routes the individual optical signals according to their switching wavelength to selected WK output ports of the wavelength router 142. The wavelength routing operation may be completely passive, for example, in an AWG. A total of WK switching wavelengths may be needed for a completely general router. However, because it may be difficult to fabricate a WK×WK AWG, parallel AWGs may process only subsets of the full WDM wavelength grid. This parallel structure imposes some constraints on the switching router but allows the number of ports on the parallel AWGs and the number of switching wavelengths to thereby be substantially reduced. Although the parallel AWGs are subject to addition congestion, the multiplicity of channels reduces the potential blocking.

Respective fixed wavelength converters 146 receive the WK outputs from the wavelength router 142 and convert the respective switching wavelengths to predetermined wavelengths in the WDM grid. Unillustrated mixers or optical combiners may be used to impose a new optical header or sub-carrier multiplexed control information on the outgoing packet, particularly if the packet is being redirected to an alternative path or if a time-to-live flag in a packet header is decremented for each routing operation. Optical multiplexers 148 combine sets of W optical signals of different wavelengths into a multi-wavelength WDM signal for transmission on K output fibers 134.

The demultiplexers 138, wavelength router 142, and demultiplexers 148 may be implemented as respective (AWGs), which for an integrated optical router may be formed in a single substrate. Silica or other glass substrates are satisfactory for passive components, but InP is preferred for active components in the 1535 to 1565 nm band typical of long distance networks. The waveguides and wavelength converters 140, 146 may also be implemented at least in part in the same substrate.

Some of the embodiments of the invention include a separate set of WDM channel elements dedicated to a recirculation path including an optical delay unit 152 on an optical feedback waveguide 154. The recirculation elements includes a demultiplexer 138, W optical delay units including respective delay components 102 although W may be different than for the transmission channels, W variable wavelength converters 140, added ports on the wavelength router 142, W fixed wavelength converters 146, and an optical feedback waveguide 154 dedicated to a recirculation path including an optical delay unit 152. The feedback waveguide 154 is connected between the output of the recirculation multiplexer 154 and the input of the recirculation demultiplexer 138. The recirculation path provides a shared circulation buffer of fixed delay, for example, between 150 and 1000 ns, typically for those packets whose output paths are blocked. If necessary, additional parallel recirculation paths may be included. The addition of each recirculation path increases the effective value of K by one, hence increasing the size of the wavelength router 142. Nonetheless, the recirculation path is not necessary and its elimination simplifies the router structure though at the cost of some congestion and packet loss. During the initial delay period provided by the input delay assembly 114, the router controller 137 may decide that no output path is available for a packet. In that case, the packet's switching wavelength is selected to switch it through the recirculation path to allow its reentry into the queue at a somewhat later time.

Figure 5:
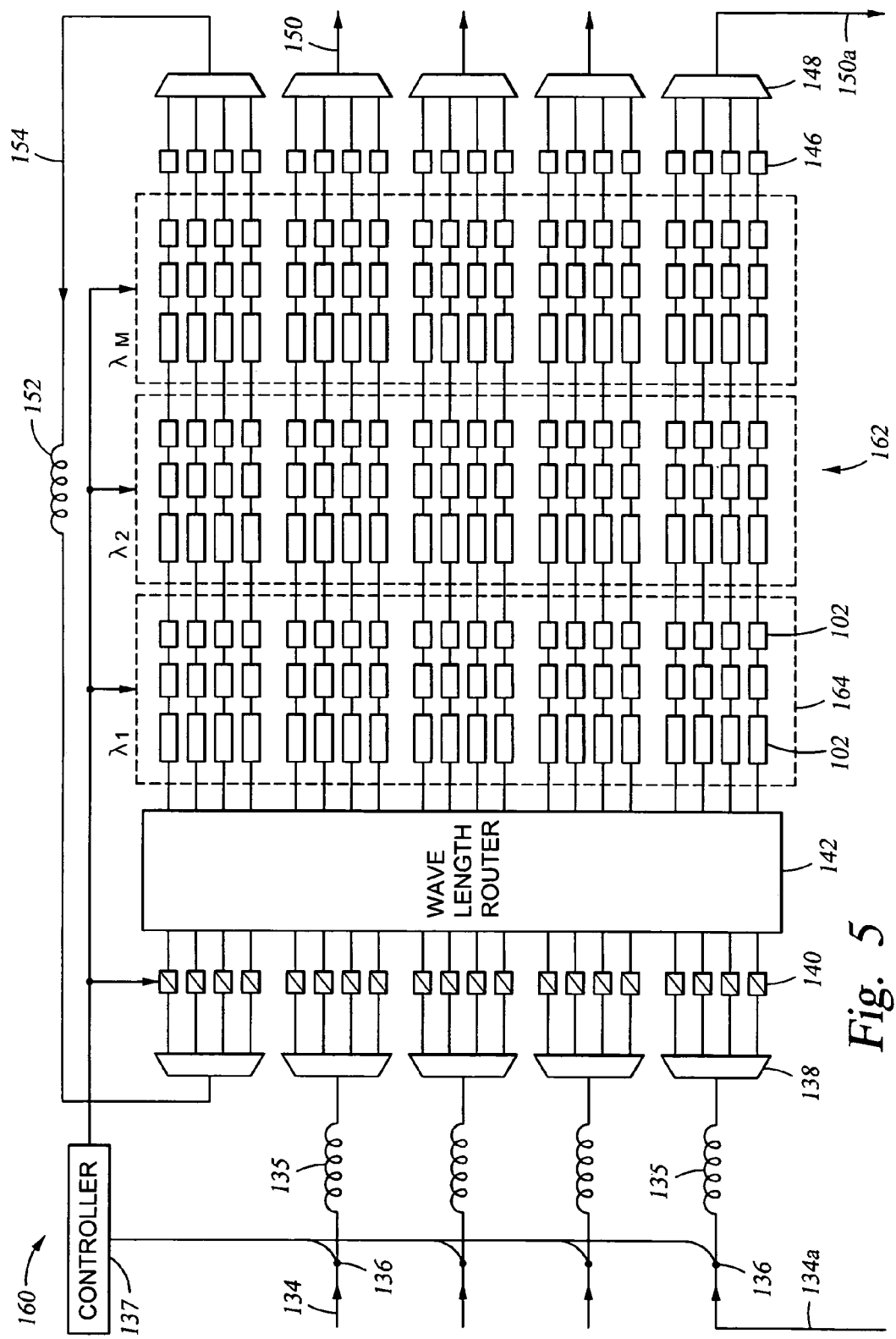
FIG. 5 is a schematic diagram of an optical router including a variable optical output buffer.
Figure 5A:
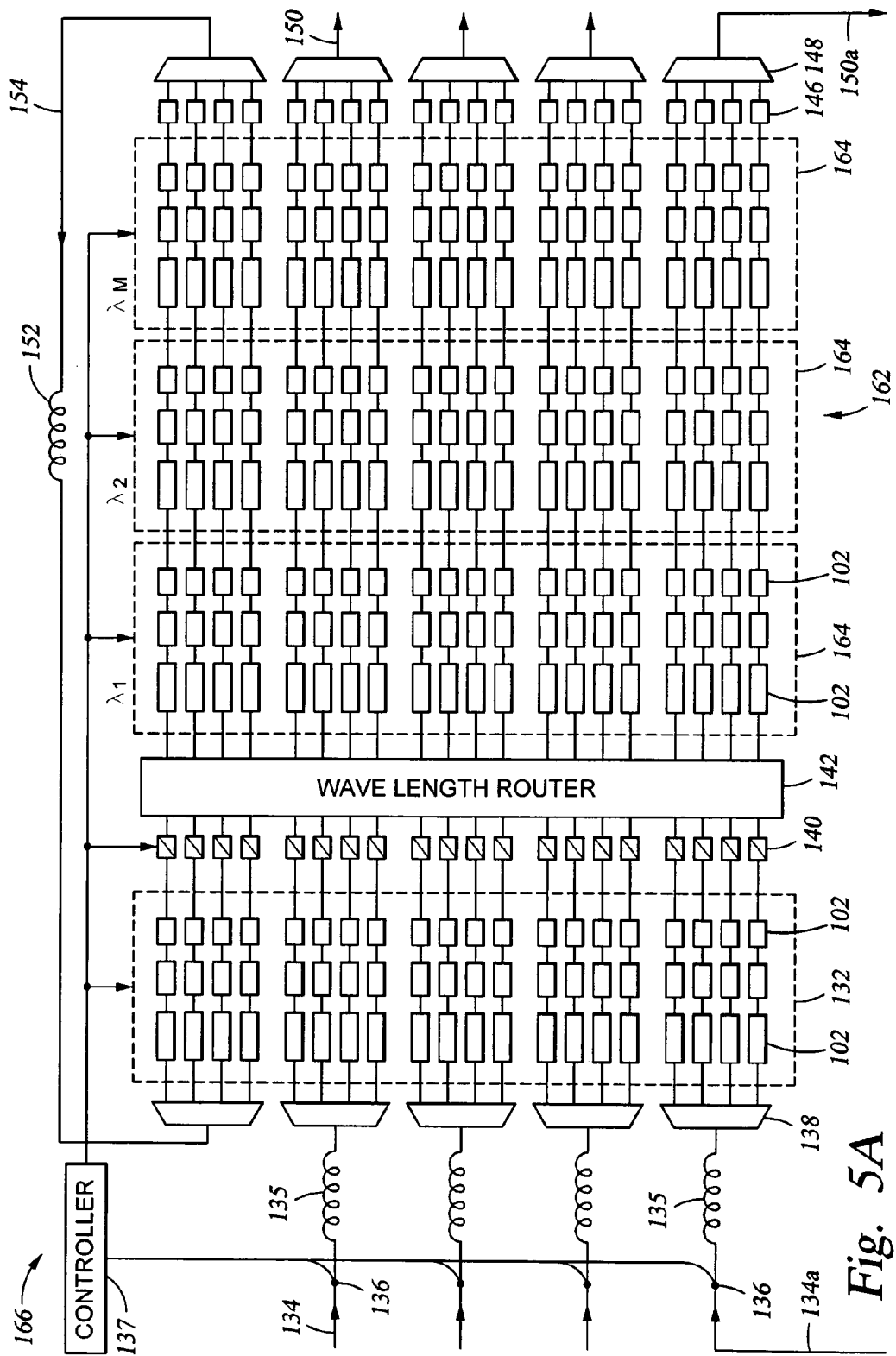
FIG. 5A is a schematic diagram of an optical router including variable optical input and output buffers.

An optical router 160, functionally illustrated in the schematic diagram of FIG. 5 includes a variable optical output buffer 162 including a cascaded series of M single-wavelength delay unit assemblies 164 in a parallel arrangement replicating the optical buffer 114 of FIG. 3. In this embodiment, each of the delay unit assemblies 164 includes parallel delay units which are separately activatable by the router controller 137 to impose a selective delay upon one of the switching wavelengths $\lambda_1$ to $\lambda_M$. For the most general W×K wavelength router having WK switching wavelength, M=WK, Mdelay unit assemblies 164 are needed. For the more restricted parallel implementations of the wavelength router, M can be considerably reduced but different output ports of the wavelength routers are passed through different sets of delay units 164 possibly having different controllable wavelengths. Different embodiments may or may not include one or more recirculation paths 154.

It is possible to employ multiple stages of the variable delay buffer so that multiple packets on the same input path can be simultaneously buffered. However, single packet buffering seems mostly sufficient.

The variable input buffer of FIG. 4 and the variable output buffer of FIG. 5 offer contrasting advantages and deficiencies. The variable input buffer offers a single-stage buffer unit with any delay element being tailored to only one WDM wavelength and not needing to consider the other WDM wavelengths. However, the input buffer queue suffers from head-of-line blocking. Multiple packets of the same WDM wavelength can be stored in the same variable input queue. However, they are stored in the illustrated structure in the order they are received, that is, first in, first out (FIFO). If the switching path for the oldest packet in the queue at the head of the line is for some reason being blocked for an unusually long time, all the younger packets behind the head of the line are also blocked.

On the other hand, the optical output buffer suffers from virtually no head-of-line block. All of the packets in a single queue associated with a particular output port of the wavelength router and the associated waveguide passing through the cascaded delay units 164 are destined for a particular WDM wavelength on a particular output fiber 150. Aside from the packet being presently transmitted onto that fiber channel, the path to that output channel is always available and the queue is always being emptied. The only blocking occurs if the output queue is insufficiently long for a particular output wavelength.

The selective delay of different switching wavelengths and the transparency of the other switching wavelengths produce the result that at any time any switching wavelength can be selected for transmission on the output channel, thus providing in some respects an optical random addressable memory (ORAM). The independent storage of different switching wavelengths in the queue for a particular output channel also means that the queue can be simultaneously receiving multiple packets from different input ports of the wavelength router 142 since they are received at the output port of the wavelength router 142 at different switching wavelengths. Simulations have shown that for input and output buffers of the same total lengths, output buffers have packet loss rates of about 10% those of input buffers. Not unexpectedly, the use of two recirculation paths offers even greater improvement in packet loss rates over one recirculation path.

An optical router employing the architecture including multi-stage all-optical variable output-queuing buffer provides versatile wavelength-aware queuing, buffering, arbitration, and load-balancing functions simultaneously for the optical packets from multiple WDM channels in combination with QoS/CoS capability. It also reduces packet loss rate, end-to-end delay, and jitter and eliminates the head-of-line blocking effect without requiring a speed increase in the internal switch fabric switching rate. These are the critical technical difficulties encountered in building a large and traditional crossbar-based input/output-buffered electronic router.

However, the advantage of reduced blocking with an optical output buffer is purchased at the price of increased complexity in the buffer structure and the need to consider a large number of wavelengths passing through each variable delay unit.

It is possible to use both variable optical input and output queues in an optical router 166 illustrated in the schematic diagram of FIG. 5, that is, to combine FIGS. 4 and 5 to include both the input buffer 132 and the output buffer 162 in their respectively illustrated positions.

The microresonator delay elements may advantageously used for other elements in an optical router. An optical router 170 illustrated in the schematic diagram of FIG. 6 replaces fiber loop delays on the input fibers with fixed resonator delay elements 172 contained in a fixed input delay unit assembly 174. The delay elements 172 are separately connected between the WDM wavelength outputs of the optical demultiplexers 138 and the corresponding variable wavelength converters 140. As a result, the delay elements 172 can be tailored to respective ones of the W WDM wavelengths. The input delay of the all delay elements 172 is selected to have a value, for example, 100 ns, to allow the controller 137 sufficient time to decode and interpret the packet header or other control information in the packet and to provide wavelength control information to the respective variable wavelength converter 140 before the packet arrives at the converter 140. It is not necessary that the delay elements be electrically controllable and may be passive since in the illustrated position the packet routing information is not yet available. However, electrically controllable input delays are useful for long term tuning of the router. The microresonator delay unit assembly 174 offers several advantages over fiber delay despite its increased complexity. Long loops of optical fiber are considered to be undesirable in field conditions and their splicing into a solid-state substrate is a manually intensive task. Furthermore, the input delay is introduced after the WDM wavelength channels have been demultiplexed. As a result, power splitters 176 may be placed between the outputs of the demultiplexer 138 and the inputs to the input delay assembly 174 to provide part of the power of the input signal to the separate optical detectors supplying the router controller 137 with routing information to tune the wavelength converters. In contrast, with the conventional single power splitter tapping power before a multi-wavelength fiber input delay and before the input demultiplexers 138, separate demultiplexers or narrow-band filter may be needed at the controller 137 to separate the multiple WDM packets.

As a separate feature, a fixed resonator delay unit 172 functionally related to the optical buffer 114 of FIG. 3 may be placed in the feedback waveguide 154 of the recirculation path to replace an optical fiber loop. The delay unit 172 preferably delays all WDM wavelength channels used in the recirculation or feedback path to provide feedback buffering. The delay unit 172 may be implemented as a series of W stages, each tuned to one of the WDM wavelengths used in the recirculation path and each having M microresonators providing a total feedback delay of MT for each of the WDM wavelengths. The total delay may be similar to that previously provided by the 100 to 1200 ns length of fiber although other delays may be implemented. It is not necessary to electronically activate the feedback delay so that the microresonators may be passive. However, it may be advantageous to be able to increase or decrease the feedback delays dependent upon long term traffic conditions.

Figure 6:
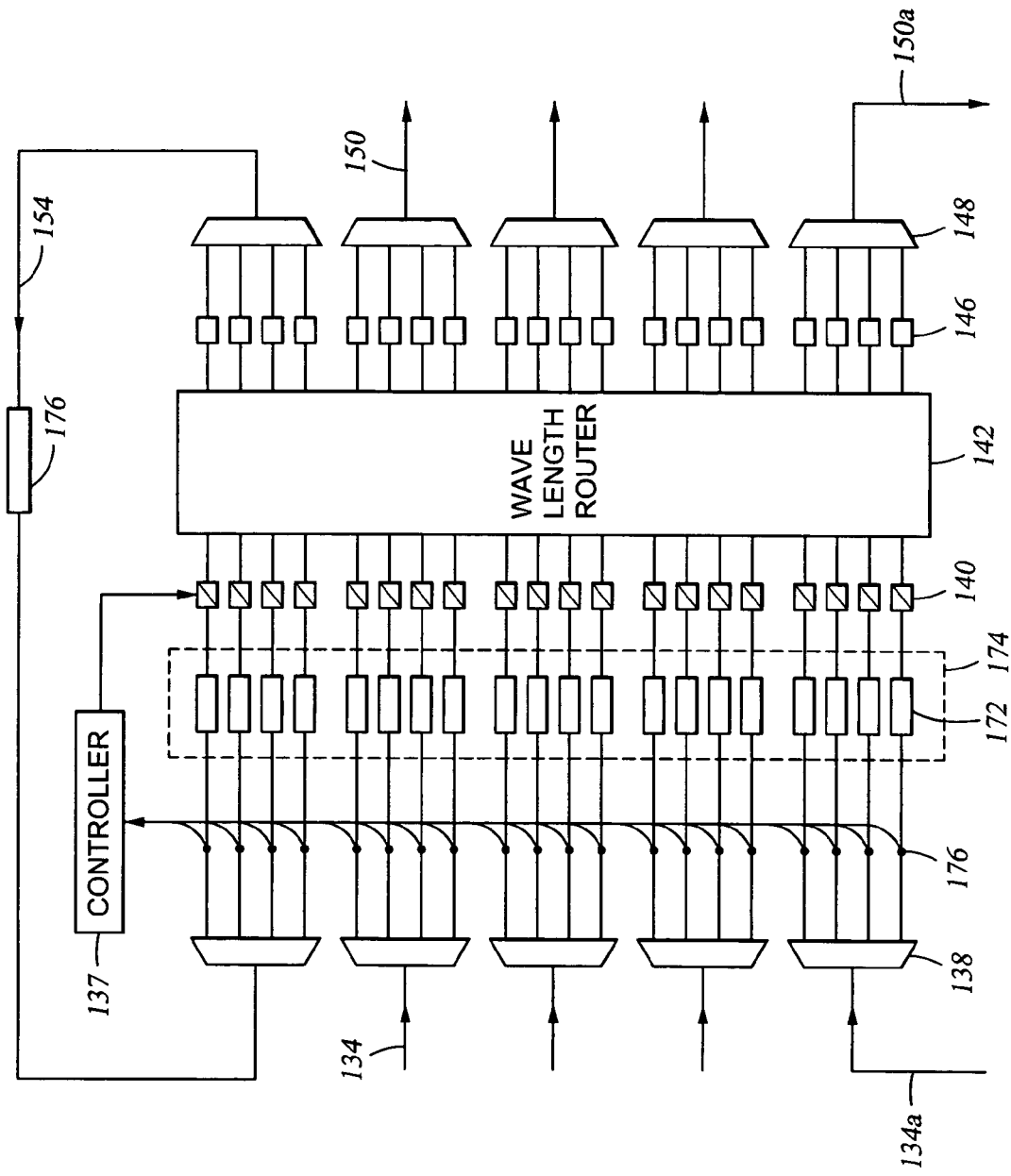
FIG. 6 is a schematic diagram of a wavelength router utilizing microresonator optical delay units, possibly of fixed duration, on its wavelength-separated inputs and on a recirculation path.
Figure 7:
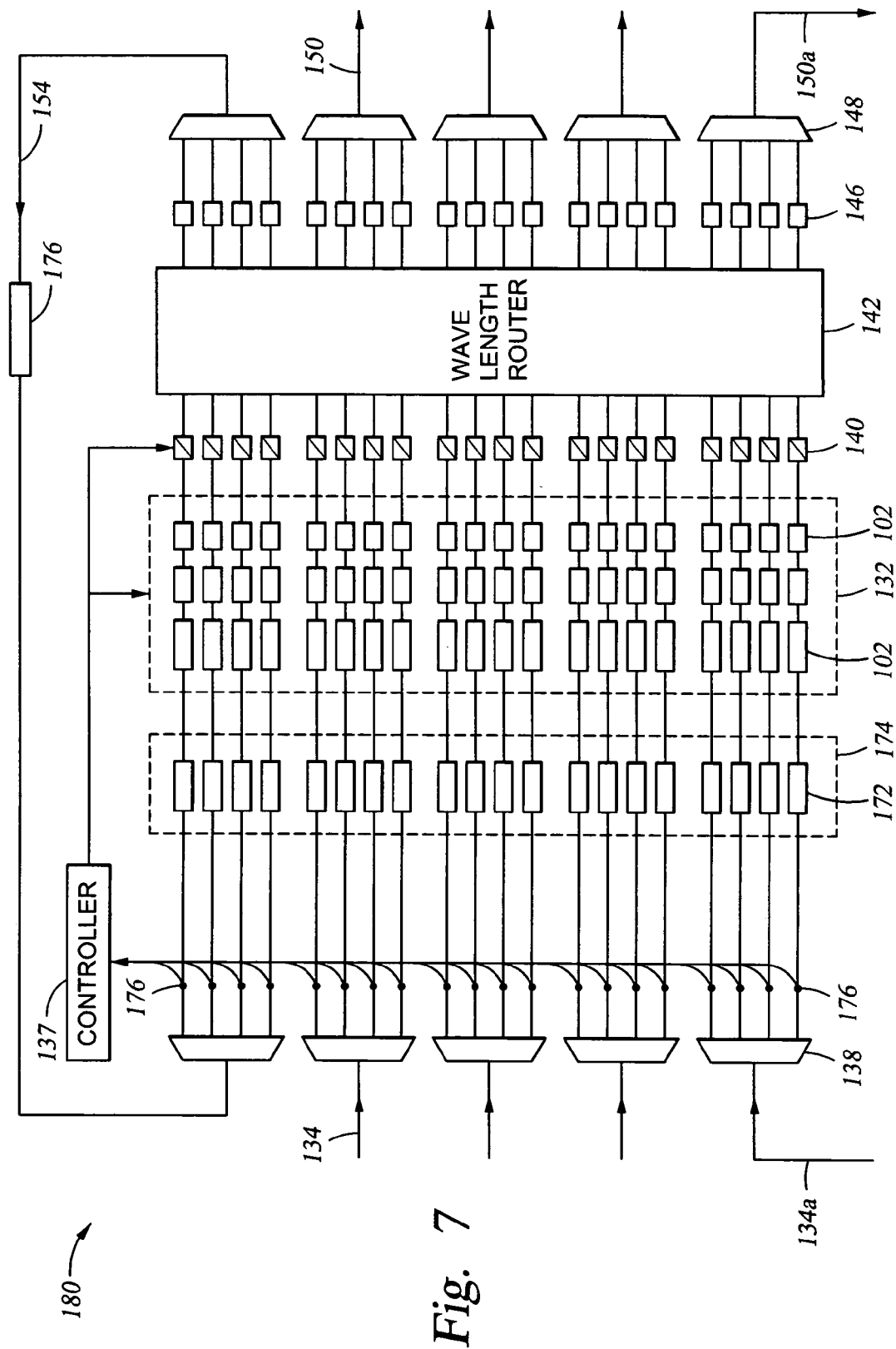
FIG. 7 is a schematic diagram of a wavelength router utilizing both fixed microresonator optical delays and a variable optical input queue.

The optical router 170 illustrated in FIG. 6 does not contain the previously described variable input or output queues. However, a router 180 illustrated in FIG. 7 and generally modeled after the router 130 of FIG. 4 includes the fixed resonator delay unit assembly 174 placed between the demultiplexers 138 and the variable input optical buffer 132. It may additionally or alternatively include the fixed resonator delay unit 176 placed in the recirculation path 154. However, as should be apparent from FIG. 7, the input delay assembly 174 can be functionally incorporated into the variable input queue 132 if the variable input queue 132 always provides at least the minimum delay necessary for decoding the header or other control information and determining where to switch the packet based on information. The optical router 160 of FIG. 5 can be similarly modified by eliminating the input fiber delays 135 and instead placing the resonator delay unit assembly 174 between the demultiplexers 138 and the tunable wavelength converters 140 or by replacing the feedback fiber delay 152 by the fixed resonator delay unit 176.

An add/drop multiplexer (ADM) is a simple form of an optical router typically selectively connecting a single pair of input and output fibers to optical add and drop channels associated with a terminal. An ADM may be implemented, among other ways, with the wavelength router implemented in more complex versions of the demultiplexer and multiplexer. The variable buffer queue of the invention may be advantageously applied to an ADM.

Although the electrically controllable microresonators provide an advantageous variable optical delay for the buffer queues and other uses in an optical router, they are also advantageously applied to other applications needing a variable optical delay implemented in an integrated structure, such as an InP chip.

Other types of optical variable delay circuits may be used for the input and output queue of the invention. Multiple values of finite delay are desirable but not essential. Other types of multiplexers, demultiplexers, and wavelength routers may be used.

The variable optical packet queuing of the invention greatly increases the performance of optical routers. The variable microresonators, particularly those coupled to one waveguide and tuned to different wavelengths, provide variably accessible optical memory.

The invention claimed is:

1. An optical router, comprising:
    at least one demultiplexer receiving a multi-wavelength signal on an input port and demultiplexing it onto a plurality of first optical paths;
    an optical routing system including routing input ports connected to said first optical paths and switching optical signals received at said routing input ports to routing output ports dependent upon carrier wavelengths of said optical signals, wherein second optical paths receive signals from said routing output ports;
    at least one multiplexer having an input port receiving said second optical paths; and
    a plurality of electrically controllable variable optical delays disposed on respective third optical paths between said at least one demultiplexer and said at least one multiplexer which include said first and second optical paths to selectively delay optical signals having selected optical carriers, wherein said variable optical delays are disposed and serially arranged along said second optical paths and specifically identified to different carrier wavelengths.

2. The optical router of claim 1, integrated into a semiconductor substrate.

3. The optical router of claim 1, wherein said variable optical delays are implemented in a semiconductor structure.

4. The optical router of claim 3, wherein said third optical paths include respective optical waveguides and said variable optical delays include a respective plurality of microresonators arranged along each of said waveguides.

5. The optical router of claim 1 further comprising additional variable optical delays disposed along said first optical paths.

6. The optical router of claim 1, wherein said optical routing system comprises a wavelength router and further comprising:
    tunable wavelength converters disposed on said first optical paths adjacent to said input ports; and wavelength converters disposed on said second optical paths adjacent to said output ports.

7. An optical router, comprising:

at least one optical demultiplexer receiving a respective multi-wavelength signal and demultiplexing it into a plurality of respective wavelength channels;

a plurality of variable wavelength converters receiving the respective outputs of the at least one optical demultiplexer;

a wavelength router receiving optical signals from said variable wavelength converters on input ports and switching them to selected ones of output ports determined by wavelengths imposed by said variable wavelength converters; and a separately controllable serially arranged multi-stage optical delay unit connected to each of said output ports and separately delaying a plurality of wavelength channels;

wherein said optical delay unit comprises a plurality of serially connected components, each of which is transparent to all but one of a plurality of switching wavelengths.

8. The router of claim 7, further comprising:

a plurality of output wavelength converters receiving signals from said delay units;

a plurality of optical multiplexers receiving outputs of respective output wavelength converters.

9. The router of claim 7, wherein said least one optical demultiplexer comprises a plurality of said at least one optical demultiplexer.

10. The router of claim 7, wherein said multi-stage delay unit provides for a plurality of finite delays for each of a plurality of said wavelength channels.

11. An optical router, comprising:

at least one optical demultiplexer receiving a multi-wavelength signal and demultiplexing it into a plurality of respective wavelength channels;

a separately controllable optical delay unit disposed on each of said wavelength channels;

a plurality of variable wavelength converters receiving the respective outputs of the optical delay units;

a wavelength router receiving optical signals from said variable wavelength converters on input ports and switching them to selected ones of output ports determined by wavelengths imposed by said variable wavelength converters;

a separately controllable multi-stage optical delay unit connected to each of said output ports and separately delaying a plurality of wavelength channels;

a plurality of output wavelength converters receiving signals from said multi-stage optical delay units; and a plurality of optical multiplexers receiving outputs of respective output wavelength converters.

12. The optical router of claim 1 wherein said optical routing system is an asynchronous routing system.

13. The optical router of claim 1, wherein said optical delays are multi-stage optical delay units.

14. The optical router of claim 1 wherein said optical delay units are respectively switchable between substantially no delay and different respective finite delays.

15. The optical router of claim 1, wherein the variable optical delays comprise an input queue connected between the demultiplexer output ports and the routing input ports.

16. The optical router of claim 1, wherein the variable optical delays comprise an output queue connected between the routing output ports and the multiplexer input ports.

17. The router claim 1, wherein the optical router is an asynchronous routing system.

18. The system of claim 1, wherein each of the optical delays is capable of storing a plurality of the packets.

* * * * *